United States Patent [19]

Greneker, III

[11] Patent Number: 4,660,038

[45] Date of Patent: Apr. 21, 1987

[54] DOPPLER DISTROMETER FOR THE MEASUREMENT OF HYDROMETER SIZE DISTRIBUTION

[75] Inventor: Eugene F. Greneker, III, Marietta, Ga.

[73] Assignee: Georgia Tech Research Institute, Atlanta, Ga.

[21] Appl. No.: 546,311

[22] Filed: Oct. 28, 1983

[51] Int. Cl.⁴ ............................................. G01S 13/95
[52] U.S. Cl. ....................................... 342/26; 342/115
[58] Field of Search ............... 343/5 W, 5 FT, 5 DP, 343/55 A, 8; 342/26, 104–117, 192–193, 195–197

[56] References Cited

U.S. PATENT DOCUMENTS

| | | | |
|---|---|---|---|
| 2,897,442 | 7/1959 | Wright et al. | 343/55 A |
| 3,400,394 | 9/1968 | Murchison et al. | 343/55 A |
| 3,543,269 | 11/1970 | Dudley | 343/5 DP |
| 3,852,743 | 12/1974 | Gupta | 343/8 |
| 4,014,019 | 3/1977 | Fetter | 343/5 W |
| 4,084,148 | 4/1978 | Koshikawa | 343/5 FT |
| 4,527,159 | 7/1985 | Bergman | 343/5 FT |

OTHER PUBLICATIONS

"Realtime Display System for HF Doppler Observation," by M. Tsutsui et al; *Report on Ionosphere and Space Research in Japan*, (vol. 30, Nos. 3–4; 12/76; pp. 89–94).

A. Hamid and S. Stuchly, "Monitoring the Velocity of Particulates Using Doppler Radar" (Journal of Microwave Power); p. 165; Jul. 1975.

M. I. Skolnik, "Police Radars", *Radar Handbook*, pp. 16–21; McGraw-Hill, N.Y., 1970.

*Primary Examiner*—Thomas H. Tarcza
*Assistant Examiner*—Bernarr Earl Gregory
*Attorney, Agent, or Firm*—Newton, Hopkins & Ormsby

[57] ABSTRACT

An apparatus and method are disclosed which employ the Doppler principle to measure the terminal velocity and, hence, the size distribution of hydrometeors such as raindrops and hailstones. The apparatus of the present invention employs a ground-based, upwardly directed, low power, 10.525 GHz homodyne continuous wave radar module to transmit microwave signals to falling hydrometeors within the size range of 0.5 mm through 4.0 cm, to record the frequency distribution and power spectrum of the reflected signals, and to process these data with "terminal velocity"-to-"hydrometeor diameter" calibration data to generate information on the hydrometeor size distribution in the precipitation under observation. The disclosed method permits a user of the apparatus to select the Doppler velocity threshold above which data are recorded for processing with a Fast Fourier Transform technique to determine hydrometer velocity values.

17 Claims, 5 Drawing Figures

DOPPLER DISTROMETER FOR THE MEASUREMENT OF HYDROMETER SIZE DISTRIBUTION

BACKGROUND OF THE INVENTION

1. Field of the Invention:

The invention relates generally to apparatus and a method for using low-power homodyne continuous wave (CW) Doppler radar to mesure the size distribution of hydrometeors, e.g., falling raindrops and hailstones.

2. Background of the Invention:

The knowledge of hydrometeor dynamics, including data on the size, size distribution and fall speed of hydrometeors constituting observed precipitation is essential to an understanding and interpretation of atmospheric processes. This kind of detailed data of actual precipitation serves different purposes. Radar meterologists in both the experimental and applications areas rely on the determination of a drop size distribution curve to calibrate their radars. Without knowledge of the drop size distribution within the radar sample area the accuracies of radar derived rainfall rates are in serious doubt. The distrometer is a necessary tool used in the discipline of cloud physics. Hydrometeor size, number, and occurrence rate provide information essential to the evaluation of cloud physics experiments.

Millions of dollars are spent annually in the field of hail research. A basic requirement of the researcher is knowledge of the size of the hail and the relative number of hailstones falling per event. A third parameter that the research would have to have recorded is hail intensity and size as functions of time, to the nearest minute. Current instrumentation techniques do not provide this fine grain time data.

The relevant prior art, therefore, is that which involves apparatus and methods to provide a user with detailed data on the velocity and size distributions of liquid or solid hydrometeors, even from relatively inaccessible regions, in real time or near-real time.

Numerous instruments, of varying capabilities, have been developed to study the size distribution of falling hailstones. See Towery, N. C., S. A. Changnon, Jr. and G. M. Morgan, Jr., 1976: A Review of Hail Measuring Instrument, *Bull. Amer. Metero. Sco.*, 57 1132–1140; and Nicholas, T.R., 1977: A Review of Surface Hail Measurement. Hail: A Review of Hail Science and Hail Suppression, *Meteor. Monogr.*, 16, No. 38, 257, 267.

Among the available instruments is the *Hailpad*. Typical forms of this device are the Styrofoam Pads Manufactured by Dow Chemical Company and cut to size by the user. The hailpad is in its simplest form is a piece of flat inexpensive styrofoam material which is used to infer the size of falling hailstones by the depth and diameter of the impact craters left in a hailpad surface exposed to the hailstone precipitation. Hailstone sizes as small as 5 mm can be so measured and the rate of precipitation can be computed by also noting the hailpad exposure time.

Although the hailpad itself is a low-cost item, there are many problems in using it. No generally accepted calibration standards exist, human reading of each hailpad's indentations is tedious and time-consuming, only solid hyrometeors can be studied, wind may cause angled impacts requiring more detailed measurements of elongated craters, craters within or on earlier craters may cause errors, and styrofoam exposed to sunlight will deteriorate.

Another popular device, usuable with liquid hydrometeors, is the *Joss-Waldvogel Distrometer*. This device provides a record of the number and sizes of raindrops striking a diaphragm surface as functions of time. Typical of this device is the Distromet Ltd. system, comprised of model RD-69 sampler, Model AD-69 analyzer, Model Qt-30 timer and Interface unit FAD-3. Raindrop diameters in the 0.5 mm to 5.0 mm range are inferred from the diaphragm's displacement due to actual impacts.

The Joss-Waldvogel distrometer is sensitive to the effect of wind on the shape and alignment of droplets as they impact the sampler surface; is sensitive to noise and vibration, e.g., high sound levels, and is limited to a maximum droplet diameter of 5 mm for accurate measurements.

An instrument suitable for use with both solid and liquid hydrometeors is the *Ground-Based Optical Array Precipitation Spectrometer* manufactured by Particle Measurement Systems, Boulder, Colo. This is a relatively new instrument that will accurately measure the sizes of rain droplets with diameters in the 0.2 mm to 12.4 mm diameter range by means of an optical system to project droplet images on a 64 element photodiode array. Although expensive and fragile, the optical array spectrometer can be used for field measurements. It has a typical weight of 50 lbs. and a power requirement of 100 watts, which tends to limit its operational flexibility for long-term use in unattended remote locations.

A recent design for a digital distrometer employs a sampling head comprised of equally spaced wires. See Donnelly, D. P. and Bulson, T. M., 1980: Digital Distrometer. 19th *Conference on Radar Meteorology*, American Meterological Society, 486–489. The droplet diameter is assumed proportional to the number of wires encountered during each droplet's passage through the plane array of parallel wires. This technique cannot readily cope with a mixture of rain and hail or a precipitation of hailstones alone.

A paper titled: "A New Precipitation Occurrence Sensor System," by Sheppard, B. E., et al. was published in the Preceedings of "the Fifth Symposium on Meterological Observations and Instrumentation" sponsored by the Amercian Meterological Society, Toronto Canada, Apr. 15, 1983 pp 38–41. This paper discusses both apparatus and a method having some features similar to those of the present invention. The Sheppard, et al., reference discloses the use upwardly directed CW Doppler radar with 10.525 GHz Gunn diode, FFT processing of the Doppler spectrum, and a microprocessor to reduce the data further. The focus of this reference, however, appears to have been to note the start and stop time of the precipitation event, identification of the type of precipitation (as snow, rain or drizzle, or hail), and the precipitation amount, rather than the size distribution of the hydrometeors. There are, furthermore, numerous differences in the operation features of the circuitry between the sheppard et al. system and the present invention.

Scientific studies dating back to 1904 provide both carefully measured data on the terminal velocities of falling droplets and various curve-fits relating terminal velocities to hydrometeor diameters in both the liquid and frozen (or solid) state. Studies of particular interest include the following:

(i) Lenard, P., 1904: Uber Regen. *Meteor. Z.*, 21, 248–262. Determined the terminal velocity of droplets in the weight range from 1,000 to 130,000 micrograms.

(ii) Gunn, R. and Kinzer, G., 1949: The Terminal Velocity of Fall for Water Drop in Stagnant Air. *Journal of Meteorology* 6, 243–248. One of the classical references, relating terminal velocity to drop diameter for droplets whose weights ranged from 0.2 to 100,000 micrograms.

(iii) Laws, J. O., and Parsons, D. A., 1943: the Relation of Raindrop Size to Intensity. *Transactions of the American Geophysical Union,* Papers on Hydrology, 452–459. Reviews the milestone measurements made before 1943, and includes their own measurements of drop size distribution as a function of several rainfall rates.

(iv) Marshall, J. S., and Plamer, W. McK., 2948: The Distribution of Raindrops With Size, *Journal of Meteorology,* 5, 165–166. Confirmed the earlier data of Laws and Parsons (1943) and the curve fits therefrom. Also improved coefficient values for the radar rainfall equation.

(v) Best, A. C., 1950: Empirical Formulae for the Terminal Velocity of Water Drops Falling Through the Atmosphere. *Quarterly Journal of the Royal Metorological Society,* 76, 302–311.

(vi) Atals, D., Srivastava, R. C., and Sekhon, R. S., 1973: Doppler Radar Characteristics of Precipitation at Vertical Incidence. *Previews of Geophysics and Space Physics,* Vol. 11, No. 1, 1–35. A comprehensive review and extension of the theoretical bases for measurement of the characteristics of rain and snow with vertically pointing Doppler radar.

(vii) Martner, B. E. and Battan, L. J., 1976: Calculations of Doppler Radar Velocity Spectrum Parameters for a Mixture of Rain and Hail. *Journal of Applied Meteorology,* 15, 491–498.

These studies, together with experimental data obtained from the hailpad and the Joss-Waldvogel distrometer, serve as sources of calibration data for the present invention, which provides a single, lowcost, relatively simple apparatus and method for the measurement of hydrometeor size distributions, in both the liquid and solid states, over a much wider range than was possible before.

SUMMARY OF THE INVENTION

Accordingly, one object of this invention is the provision of novel apparatus for measurement of hydrometeor size distributions.

Yet another object of this invention is the provision of novel apparatus for determination and recordation of the type, accumulation rate, timing and duration of hydrometeor precipitations.

A related object of this invention is the provision of novel apparatus which is fully automatic in operation and is capable of providing detailed hydrometeor data from remote locations.

Another related object of this invention is the provision of novel apparatus which records measured hydrometeor data only when the user-specified threshold value of a selected physical parameter is observed.

Another object of this invention is the provision of a novel method for measurement of hydrometeor size distributions.

Yet another object of this invention is the provision of a novel method for determination and recordation of the type, accumulation rate, timing and duration of hydrometeor precipitations.

A related object of this invention is the provision of a novel method for automatic measurement and provision of detailed hydrometeor data from remote locations.

Another related object of this invention is the provision of a method in which a user specifies the threshold value whose observance, for a selected physical parameters, causes recordation of measured hydrometeor data.

Briefly, these and other objects of the invention are achieved by transmitting a low power homodyne CW radar signal in a vertically upward direction at hydrometeors falling at terminal speed towards the radar module. The same radar module receives the reflected signal from numerous hydrometeors of varying sized falling at correspondingly different vertical velocities. The received signal constitutes a Doppler velocity spectrum which is subjected to a Fast Fourier Transform (FFT) and further processed with calibration data to generate the hydrometeor size distribution for the observed precipitation. The Doppler power spectrum from the signals relfected back from the falling hydrometeors may be processed to yeild information on the type and amount of precipitation, which can be readily combined with chronological data to provide the duration, time history and rate of precipitation at the measurement location. Provision is made to cause recordation of data only when a user-specified threshold value of a relevant parameter, e.g., of hydrometeor velocity, is observed. The apparatus of the invention is convenient for disposition in remote locations for prolonged unattended service, and may be provided with its own power source. Data from the apparatus of the invention may automatically be recorded or transmitted to a remote user.

BRIEF DESCRIPTION OF THE DRAWINGS

A more complete appreciation of the invention and many of the attendant advantages thereof will be readily obtained as the same become better understood by reference to the following detailed description when considered in connection with the accompanying drawings, wherein.

DETAILED DESCRIPTION OF THE PREFERRED EMBODIMENT

Data Acquisition and Recordation

Figure 1:
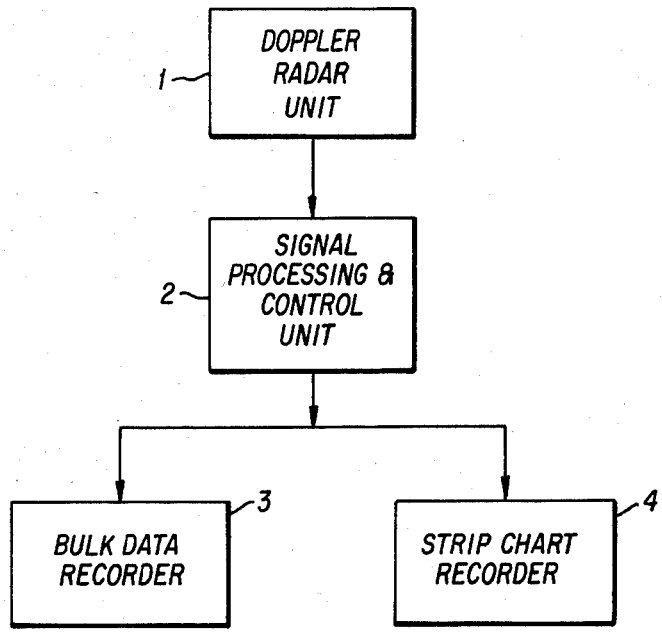
FIG. 1 shows the principal components of one embodiment of the invention.

An understanding of the functioning of the preferred embodiment of the invention is facilitated by reference to the drawings, wherein like reference numerals designate identical or corresponding parts wherever they are shown. Referring now particularly to FIG. 1 thereof, the principal components of the invention apparatus include a conventional Doppler radar unit 1 such as the the Model MA86656 Series Microwave X-band transceiver, produced by Microwave Associates, Burlington, Mass., a signal processing and control unit (SPCU) 2, including a panel bearing selector switches for user adjustment of assorted controls, described more fully hereafter; a bulk data recorder 3, which in the preferred embodiment is a conventional magnetic tape cassette recorder produced by Radio Shack, and a visual strip chart recorder 4 produced by the Easterline-Angus Company, from which the user can determine at a glance when events occurred and the maximum velocity of the hydrometeors observed. The apparatus, in typical operation, samples observable precipitation phenomena as described more fully below.

Figure 2:
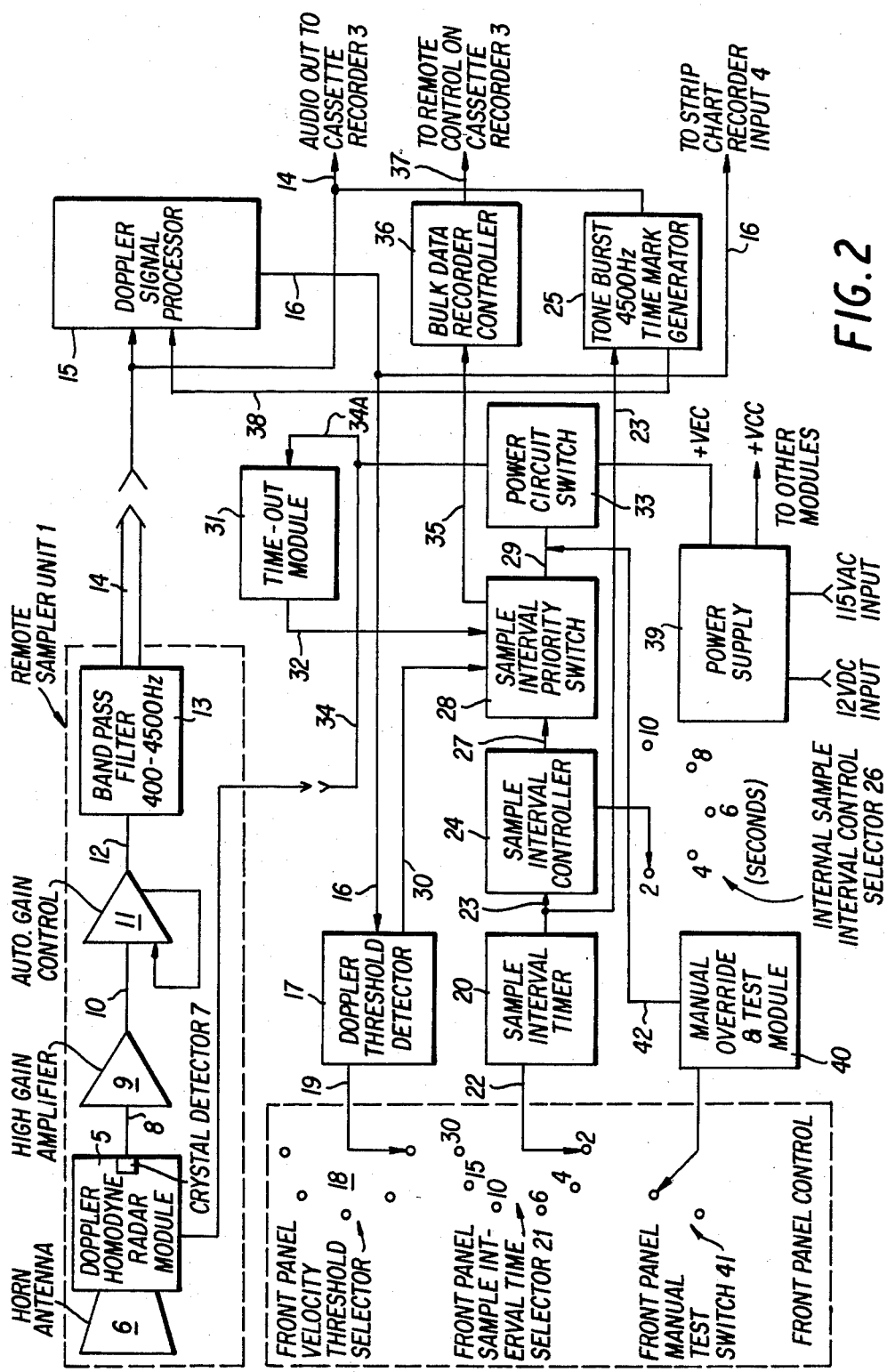
FIG. 2 is a block diagram of the Doppler distrometer, wherein each block and branch of the electrical circuitry connected thereto are labelled for convenient reference.

FIG. 2 shows in more detail the components together with the interconnections among the component contained within the Doppler radar unit 1 and the signal processing and control unit 2 (which under operating conditions may be located hundreds of feet apart). A conventional Doppler homodyne radar module 5, such as the Model 86656 X-Band Transceiver produced by Microwave Associates Inc. operates preferably on a frequency of 10.525 GHz from a Gunn device transmitter to provide a continuous wave signal at power outputs that range from 5 mW to 100 mW. In its normal operating posture, the antenna system 6 would direct the output signal vertically upward at the falling hydrometeors. Each moving hydrometeor reflects back a small portion of the radar signal incident on it at a Doppler shifted frequency determined by its downward velocity, according to the following relationship:

$$F_\alpha = 2VF_o/C$$

Where $F_\alpha$ = Doppler Frequency in Hertz
V = terminal velocity in m/sec
C = speed of light in m/sec
$f_o$ = transmitter frequency in Hertz These Doppler-modulated relfected signals from numerous hydrometeors are received by a conventional crystal detector 7, located in the Microwave Module 5, which produces an output of a composite analogue signal that can range in amplitude from 30 mV to 200 mV depending on the target cross section and range. This signal appears on line 8 and is supplied to a high gain amplifier 9 designed to provide approximately 85 dB gain and a frequency response flat to within +/−3 dB from 60 Hz to 6000 Hz. The output of high gain amplifier 9 appears on line 10.

A conventional automatic gain control (AGC) circuit 11, capable of providing over 40 dB of signal compression without introducing waveform distortion, compresses the signal it receives on line 10 only when the signal level exceeds a peak-to-peak level of 2 volts. The output of the AGC circuit 11 is applied via line 12 to a band-pass filter 13 designed to provide a roll-off of over 20 dB per octave at out-of-band frequencies and to have a +/−3dB pass-band region extending from 100 Hz to 4500 Hz.

The output of band-pass filter 13 appears on line 14, and, via a remote cable if desired, feeds a conventional Dopoler signal processor 15 and also provides a direct signal to the bulk data recorder 3. In the preferred embodiment this takes the form of an audio input to a cassette tape recorder 3. The Doppler signal processor is a standard frequency-to-voltage converter which converts Doppler frequency to a proportional d.c. voltage as is well-known to those skilled in the art. Typically, it is the frequency of the signal with the largest amplitude or the sum of equal amplitude signals that is converted to a proportional d.c. voltage which appears on line 16. The d.c. voltage in line 16 is used to drive the pen of a strip chart recorder 4 and a Doppler threshold detector 17, formed of a conventional comparator, which controls the data sampling process when hydrometeors are falling at velocities exceeding a user selectable threshold velocity.

The velocity threshold is set by means of a selector switch 18, on the front panel of the SPCU 2, which causes a reference voltage to appear on line 19. The Doppler threshold detector 17 compares the voltage on line 16 to the voltage on line 19. When the voltage on line 16 equals or exceeds the voltage on line 19 a time-out module 31 is activated as discussed below.

A selector switch 21 is used to set the sampler interval for sample interval timer 20 connected thereto by line 22. By adjusting the setting of switch 21 the user determines the time intervals at which the apparatus is activated to sample the environment for data on observable precipitation. Each time sample interval timer 20 is activated, line 23 is activated and the voltage on it activates both a sample interval controller 24 and a tone burst generator 25.

The sample interval controller 24 is activated each time line 23 is activated, and the ensuing sample time is preselected by the user by selecting a setting on sample interval control selector switch 26. During the selected interval the apparatus will take data even if there are no hydrometeors that exceed the selectable velocity threshold, and line 27 will remain activated for the entire period selected by the smaple interval control selector 26.

A sample interval priority switch 28 determines how the data sampling is carried out. During the time that line 27 is activated, sample interval priority switch 28 activates line 29, causing the apparatus to sample the environment to measure the size distributions of any hydrometeors falling within the field of its antenna system 6. If hydrometeors are present, and their velocities exceed the pre-set velocity threshold set by way of line 19, then line 30 is activated, whereby control priority is turned over the Doppler threshold detector 17 and the apparatus actively samples data until the hydrometeor velocity drops below the threshold velocity value selected by the user-selected setting on selector switch 18. A bulk data recorder controller 36 is activated via line 35 to record the observed date.

A signal on line 34A activates the time-out module 31 at the start of each cycle. The time-out module 31 via line 32 will cause a re-set to occur if the maximum recording time per event is exceeded on a continuous basis due to system malfunction and will turn off the system for a pre-set time if a selectable maximum event time is exceeded. Activation of line 32 inhibits any control functions on line 30 from controlling the system until the time-out module 31 resets itself after a preselectable period. The normal action of the sample interval timer circuit 20 is not affected and time marks, as explained below, continue to be recorded at fixed intervals, as does a brief sampling of hydrometeor data during the interval that line 27 is activated.

Power circuit switch 33 is a d.c. switch that activates line 34 to provide power to the Doppler radar module 5 for the duration that line 29 is active and starts the time-out Module via line 34A. The bulk data recorder controller module 36 activates the data recordation process via line 37 when line 34 is activated so that the bulk recorder is recording radar data at all times when the apparatus is actively sampling data.

The tone-burst 4500 Hz time-mark generator 25 provides a one-second burst of marker tone each time line 23 is active, which is each time that sample interval timer 20 times out. The 4500 Hz tone from time-marker generator 25 is fed to the Doppler signal processor 15 via line 38, and an attenuated tone burst signal is fed to the bulk data recorder, e.g., audio input to a magnetic tape cassette player, via line 14. Each time the tone burst appears on line 38, maximum voltage output from the Doppler signal processor appears on line 16 which provides input to the strip chart recorder 4 and drives its pen to maximum deflection. This maximum pen deflection ensures that the time marks recorded on the strip chart will not be confused with the high velocity hydrometeor data that also appear on the strip chart record. Line 34 is also active at this time and hence the data recorder 3 is on at any time that a marker tone is generated. The marker tone provides information regarding the time at which an event occurs. The one-second burst of the marker tone is triggered each time sample interval timer 20 times out, hence the event time of an occurence can be easily computed by multiplying the number of time bursts between the event of interest (and a chronological reference point) by the period between activations of sample interval timer 20 as selected by setting selector switch 21. Since the tone burst time mark also appears on the strip chart record, the time that events of interest occur can be rapidly computed from the strip chart record itself.

The apparatus of FIG. 2 shows an optional dual power supply 39 whereby electrical power may be provided to the system either from a 12 volts d.c. (12 VCD) source such as a battery or a 115 volts a.c. (115 VAC) conventional commercially available electrical power source. The system may therefore be very conveniently set up to operate on 115 VAC standard line voltage whereever this is available, on 12 VCD battery power if operation is in a remote location or, optionally, with 115 VAC backed up by emergency switchover to 12 VDC reserve batteries. The power supply 39 can be electronically regulated in any conventional manner to supply the proper operating voltage for the Gunn device transmitter and associated circuitry in radar unit 1.

The apparatus shown in FIG. 2 includes, as a test feature, an optional manual override and test module 40 allowing the system to be activated manually, via a front panel manual test switch 41, regardless of the time that has elapsed in the timing interval. Such manual activation via line 42 turns on the transmitter of the Doppler radar module unit 5 and bulk data recorder 3, places a tone burst on the data record of recorder 3, and causes the pen of strip chart recorder 4 to deflect full scale.

Various modifications of the apparatus depicted in block diagram form in FIG. 2 are possible and will be apparent to persons familiar with electrical circuitry and data collection techniques. Thus, for example, any bulk data recorder such as a disk or magnetic card recorder could easily be used in place of the magnetic tape cassette recorder 3 chosen in the preferred embodiment. The Doppler radar unit may easily be made physically integral with the other principal components of the apparatus of the invention, without affecting their respective roles or relationships to each other. On the other hand, through remote cables or by means of any of various conventional long-range communication links, certain components may be located in geographically remote locations without adversely affecting the capacity of the apparatus to perform its useful functions.

The preferred embodiment utilizes analogue circuitry to achieve the functions of the modules shown in FIG. 2. However, this basic data sampling system can also be implemented using micro-processor technology in a relatively straightforward manner. Knowledgeable practitioners in the art of data processing will recognize that with currently available hardware the control fucntions could be programmed in "read only memory" (ROM) and executed by micro-processor circuitry driving the Doppler distrometer through a peripheral interface adapter (PIA).

Figure 4:
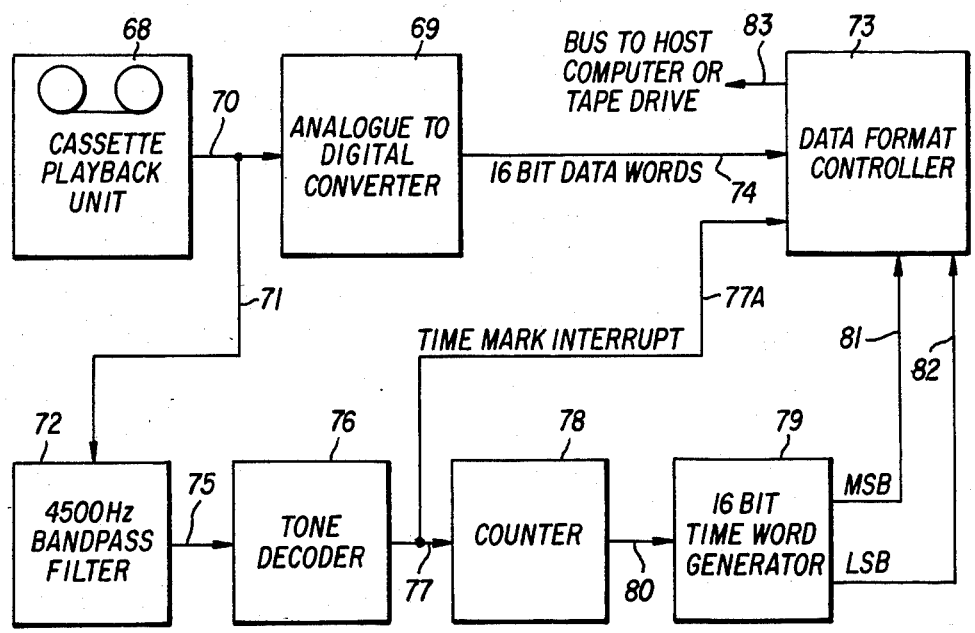
FIG. 4 is a block diagram showing the system of the invention.

Within the scope of this invention, an enhanced embodiment of the same could have all important system functions controlled by the same micro-computer that would also handle all the signal processing shown in FIG. 4. The radar module 5 would transfer the analogue velocity spectrum data to the bulk data recorder 3, as described, under micro-processor control, and after the event of interest ends the micro-processor would read the analogue data recorded during the event. If the bulk data recorder 3 is a conventional tape recorder this would involve rewinding the tape in start-stop fashion. The analogue-to-digital converter, 69, would read the analogue data until the digitization of 4096 points was completed. The tape would stop and the FFT would be performed on those 4096 points. These points would be stored in memory, the tape recorder restarted and 4096 more points would be digitized, FFted, and stored, until all the analogure data was exhausted. The system would then record the stored processed data in memory on the cassette behind the analogue record of the event. Time data from a clock would also be part of the digital velocity spectrum data record. This data would be added during digitization. Thus, the user would have the original unprocessed analogue data and the processed velocity spectrum data on the tape as it came from the field. The processing of data in the field during idle time would save time during the final processing of laboratory quality data.

System Operating Cycles

Figure 3:
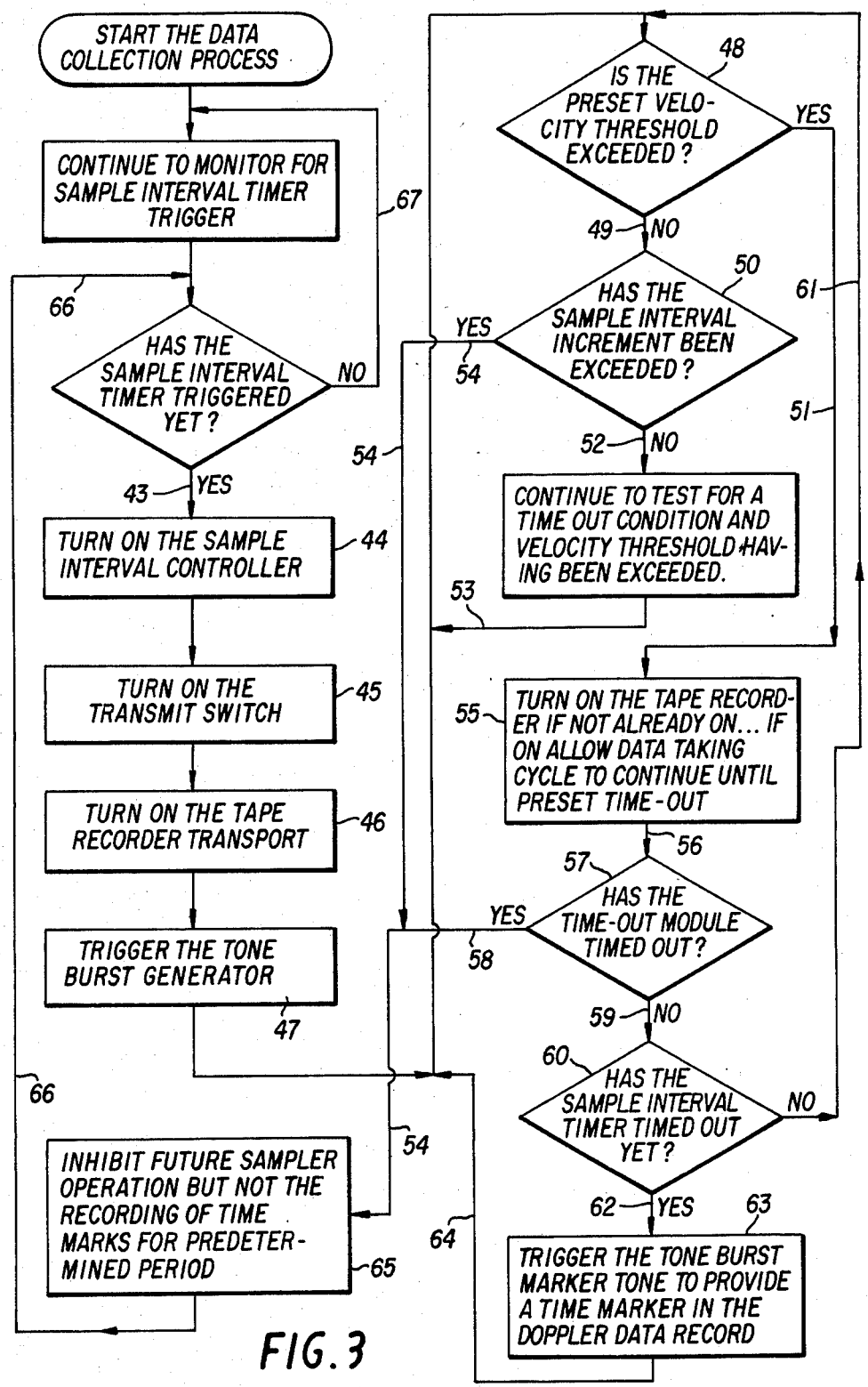
FIG. 3 is a block diagram of a data reduction method.
Figure 5:
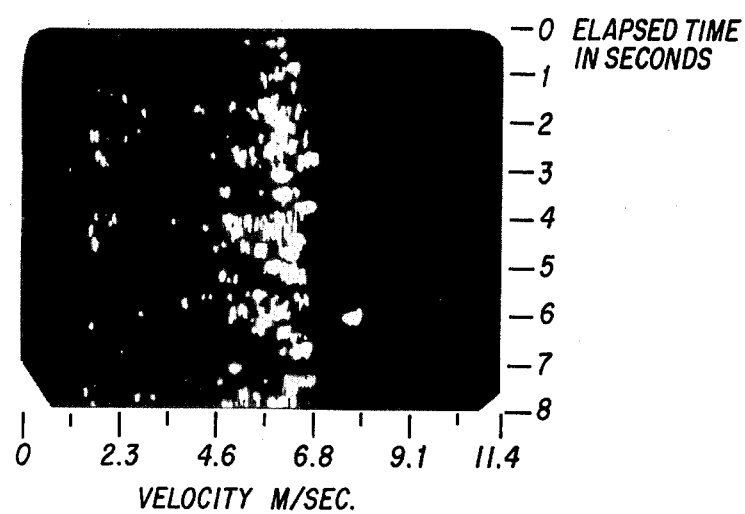
FIG. 5 is a visual representation of raindrop velocity data recorded during a light rainfall using the disclosed invention.

FIG. 3 is a diagram showing the Doppler distrometer cycles that are possible and the conditions that lead to their occurence. It will be recognized by persons familiar with current data processing and computer-controlled equipment that these control cycles are straightforward and will operate with equal efficiency in a hardware or a software control system.

Referring to FIG. 2 and FIG. 3, the user initiates the data collection process taking action as follows:

a. Selecting the minimum velocity threshold of interest; accomplished by setting selector switch 19. See FIG. 2.

b. Selecting the interval at which data sampling will occur; accomplished by setting selector switch 21. See FIG. 2.

c. Selecting the sample period duration; accomplished by setting selector switch 26. See FIG. 2.

The system continues to wait for the sample interval timer 20 to time-out; when this time-out occurs, 43 in FIG. 3, the system proceeds as illustrated in FIG. 3 and more fully described below with references thereto, as follows:

44. The sample interval timer 20 is activated.

45. This action cuases the Doppler radar signal transmitter in module 5 to be switched on.

46. Simultaneously, the bulk data recorder 3 is switched on.

47. A burst of marker tone is sent to the bulk data recorder 3 and to the pen of the strip chart recorder 4, causing the pen to deflect full scale.

48. The output voltage of the Doppler signal processor 15 is compared to the threshold value set via selector switch 18 to determine if a target Doppler velocity that exceeds this threshold is present.

49. If the answer to the preceding check is negative, a test 50 is performed to determine if the sample interval increment set via selector switch 21 has been exceeded. If so, 54, the system should re-set for the next interval trigger. If the sample interval has not been exceeded, 52, the loop is repeated, 53, and the tests for velocity threshold, 48, and system timeout, 50, are performed again.

54. If the system is reset, "time-out" occurs, the "YES" branch, 54, is taken, and the cycle begins again, 66.

55. When the pre-set Doppler velocity threshold is exceeded, 51, the bulk data recorder is turned on for the pre-set period, which had been determined via selector switch 26, and the full spectrum hydrometeor data are recorded. The transmitter sample cycle is not controlled by the sample interval timer, 20, after the system determines that an event of interest, wherein observed hydrometeor velocities exceeding the threshold value are present, has occurred.

56. When the pre-set Doppler velocity threshold is exceeded, the sample time is controlled by the Doppler threshold detector 17 and system "time-out" module 31. Now the system, will actively record all hydrometer data as long as the velocity threshold is exceeded, 48, or until a default time-out from the time-out module 31 occurs.

57. While the system is under the control of the Doppler threshold module the one-second long 4500 Hz tone is placed on the bulk data recorded by bulk data recorder 3 each time the sample interval timer, 20, times out. A test, 58, is also performed by the loop to determine if the time-out function has occurred.

58. When the velocity loop recycles, 61, and the velocity threshold is no longer exceeded in the data under observation, 49, and the sample interval increment has been exceeded, 54, the transmitter turns off and the system is returend to the sample mode 67 controlled by the sample interval timer 20.

In the preferred embodiment the recorded data will reside on magnetic tape in cassettes which can be physcially removed for non-real time data reduction at a suitable location. Alternative methods of making the recorded data available to the data reduction facility include transmission of the data over remote lines and by radio. Numerous techniques suitable for storing the recorded data at various stages exist and are comtemplated as alternatives within the scope of this invention, e.g., magnetic cards, magnetic disks, laser recorded disks and the like.

Data Reduction

It is hightly probable that meteorological monitoring over an extended area would require an array of Doppler distrometers and that, consequently, a considerable amount of data would have to be processed for the full value to be extracted therefrom. One practical solution would be to periodically collect and transfer all the data records from the various bulk data recorders 3, each containing the raw velocity and Doppler spectrum data provided by its respective Doppler signal processor 15, to a central data processing facility for non-real time data reduction FIG. 4 shows one data reduction scheme suitable for such a situation. Persons skilled in data reduction techniques will readily visualize comparable alternatives to perform the same function.

FIG. 4 shows a cassette playback unit 68 which uses the distrometer data record in analogue form to drive a conventional analogue-to-digital (A-to-D) converter 69, via line 70. Line 71 provides the same analogue form of the data to a 4500 Hz bandpass filter 72. The recorded waveforms representing the velocity spectrum and the power amplitude of the Doppler signal are digitized by the A-to-D converter 69 for transmittal as 16-bit words to a conventional data format controller 73, via line 74. Simultaneously, the 4500 Hz bandpass filter 72 allows only the 4500 Hz time marker signal to pass via line 75 to a conventional tone decoder 76, which produces a simple pulse of fixed duration each time the 4500 Hz tone is passed to it. The output pulse from tone decoder 76 is used to perform two functions. First, via line 77A it supplies a time mark interrupt signal to the data format controller and, second, via line 77, it advances the count of a conventional 16-bit counter module 78.

Each detection of a one-second burst of 4500 Hz timer marker tone inhibits the digitized data stream from the A-to-D converter 69 for the tone's duration and the count from a conventional 16-bit time word generator 79, driven by counter 78 via line 80, is written via lines 81 and 82 to the data format controller 73, and thus to a host device via data bus 83.

Data format controller 73, through bus 83, formats the data to a conventional host mini-computer, microprocessor or mass storage device such as a digital tape drive for processing at a central computer facility, depending on the data reduction method selected by the user, for conversion by application of a Fast Fourier Transform, into velocity distribution data. A further step in the conversion process, involving conversion of power spectrum data into hydrometeor velocity and further into particle size data by computer implemented algorithms, converts the velocity distribution into size distribution for the observed hydrometeors.

All data on line 74 from the A-to-D converter 69 is inhibited by data format controller 73 during the 4500 Hz tone burst sensed by it via line 77A. This one-second inhibit action prohibits the 4500 Hz digitized marker tone from being processed. Instead, a 32-word header containing the marker tone occurrence count is delivered to the host computer or data mass storage device 83. Thus, during the one-second period of marker tone the host sytem is free to perform appropriate operations under the control of its data reduction source program.

Algorithms of the type that utilize a discrete fast fourier transform routine, and a resuitable for processing the hydrometeor velocity data, are readily available as standard user library routines for use with numerous commercially available computers. This approach, assuming a 10,000 Hz sample rate, and 4096 sample points, provides a 4 Hz resolution between points in the data when the power spectrum function is computed. This degree of resolution allows velocity determination to an accuracy of the order of 0.06 m/sec. The power spectrum of the FFT may also be utilized to compute the accumulation of precipitation when combined with drop size distribution and with time data, the start and stop times, as well as the precipitation rate.

Finally, by means of calibration information, typified by that developed by Beast and by Martner & Battan (cited above) and hereby incorporated by reference, the velocity information may be translated into hydrometeor size distributions and may also be utilized to discriminate between liquid and solid hydrometeor precipitations. This is readily accomplished by providing the host computer memory with calibration data, optionally in the form of empirical curve-fit formulae such as those available in the references already cited.

It will be apparent to those familiar with data transmission techniques and the conventional individual system elements depicted in FIG. 4 that by having remote lines or, where preferably, radio transmission of the data from each distrometer to a data processing station, a user may generate real-time data on hydrometeor size distribution. The use of such alternatives is comprehended within the scope of this invention.

Obviously, numerous additional modifications and variations of the present invention are possible in light of the above teachings. It is therefore to be understood that within the scope of the appended claims, the invention may be practiced otherwise than as specifically described herein.

What is claimed as new and desired to be secured by letters patent of the United States is:

1. An apparatus for determining a size distribution of hydrometeors, comprising:
   source means for providing continuous wave radiation;
   reflecting means coupled to said source means for directing said radiation toward said hydrometeors;
   receiving means cooperating with said source means for receiving radiation reflected by said hydrometeors;
   detector/filter means coupled to said receiving means for converting said reflected radiation into a first signal constituting a velocity spectrum of said hydrometeors;
   recording means for recording said first signal in electrical form; and
   transforming means coupled to said recording means for transforming said first signal into a signal constituting said size distribution of said hydrometeors.

2. An apparatus as in claim 1, further comprising:
   processor means for converting the frequency of said first signal to a dc voltage value; and
   first control means coupled to said processor means for actuating said recording means when said dc voltage signal exceeds a predetermined dc value corresponding to a predetermined rate of falling hydrometeors.

3. An apparatus as in claim 2, further comprising:
   second control means coupled to said receiving means for operating said reflecting means for time separated successive periods each of predetermined duration.

4. An apparatus as in claim 3, further comprising:
   recording means coupled to said processor means means for visually recording said first signal with notations representing elapsed time.

5. An apparatus as in claim 4, further comprising:
   testing means connected to said receiving means for testing the operational status of components of said apparatus at any time.

6. A method for determining the size distribution of hydrometeors, comprising the steps of:
   projecting continuous wave homodyne radiation toward a volume occupied by said hydrometeors;
   receiving radiation reflected by said hydrometeors;
   converting said reflected radiation into a first signal constituting a velocity spectrum of said hyrometeors; and
   transforming said first signal into a second signal representing a size distribution of said hydrometeors.

7. A method as defined in claim 6, further comprising the step of:
   recording said first signal.

8. A method as defined in claim 7, further comprising the setps of:
   energizing the radiation of time spaced periods each of predetermined duration;
   converting the frequency of said first signal to a dc voltage signal; and
   extending said time spaced periods of energizing the radiation and the time of recording said fist signal when a maximum value of said dc voltage signal exceeds a predetermined value.

9. A method as defined in claim 8, further comprising the step of:
   visually recording said first signal along with notations representing elapsed time.

10. A method as defined in claim 9, further comprising the step of:
    applying a Fourier transform to said first signal in transforming it into said second signal.

11. A method as defined in claim 10, further comprising the step of:
    applying a velocity-to-size calibration transform to said first signal in transforming it into said second signal.

12. A method for determining the size distribution of hydrometeors, comprising the steps of:
    projecting continuous wave homodyne radiation toward a volume occupied by said hydrometeors;
    receiving radiation reflected by said hydrometeors;
    converting said reflected radiation into a first signal constituting a velocity spectrum of said hydrometeors;
    recording said first signal;
    applying a Fourier Transform to said recorded first signal; and
    applying a velocity-to-size calibration transform to said Fourier transformed first signal to transform it into a second signal representing a size distribution of said hydrometeors.

13. A system for recording echo signals indicative of the velocity spectrum of falling hydrometeors so that data indicative of the size, velocity and distribution of said falling hydrometeors may be derived from the recorded data, which comprises the combination of:
    radar means for illuminating a volume which may contain falling hydrometeors and for receiving echoes therefrom which are Doppler-shifted in frequency due to the velocity and cross section of the falling hydrometeors;
    sampling means for intermittently energizing said radar means repetitively to initiate sample intervals of selected time duration during which said radar means is active;

means for producing an audio signal from said Doppler-shifted echoes which represents the velocity spectrum of said falling hydrometeors;

means having said audio signal as an input for generating a dc voltage signal from the frequency spectrum of said audio signal; and threshold means for extending said sample intervals when said dc signal exceeds a predetermined value indicative of the presence of falling hydrometeors having a selected threshold velocity.

14. The system as defined in claim 13 including recording means for recording said audio signal and means for generating a marker tone signal which is recorded by said recording means to delineate each of the sample intervals.

15. A system as defined in claim 14 including second recording means for recording said dc signal and said marker tone signal.

16. A system as defined in claim 15 wherein said threshold means includes a time-out module for extending said sample interval.

17. A system as defined in claim 16 wherein said threshold means also includes a comparator which compares said dc signal to a preselected value.

* * * * *